G. T. Parry,
Steam-Boiler Water-Feeder,
N° 64,026. Patented Apr. 23, 1867.

Witnesses:

Inventor;
George T. Parry

United States Patent Office.

GEORGE T. PARRY, OF PHILADELPHIA, PENNSYLVANIA.

Letters Patent No. 64,026, dated April 23, 1867.

IMPROVEMENT IN BOILER FEEDERS.

*The Schedule referred to in these Letters Patent and making part of the same.*

TO ALL WHOM IT MAY CONCERN:

Be it known that I, GEORGE T. PARRY, of the city and county of Philadelphia, and State of Pennsylvania, have invented a new and useful Improvement in Automatic Feeders for Steam Generators; and I do hereby declare that the following is a full, clear, and exact description of the same, reference being had to the annexed drawings, making part of this specification, in which—

Figures 1, 2:
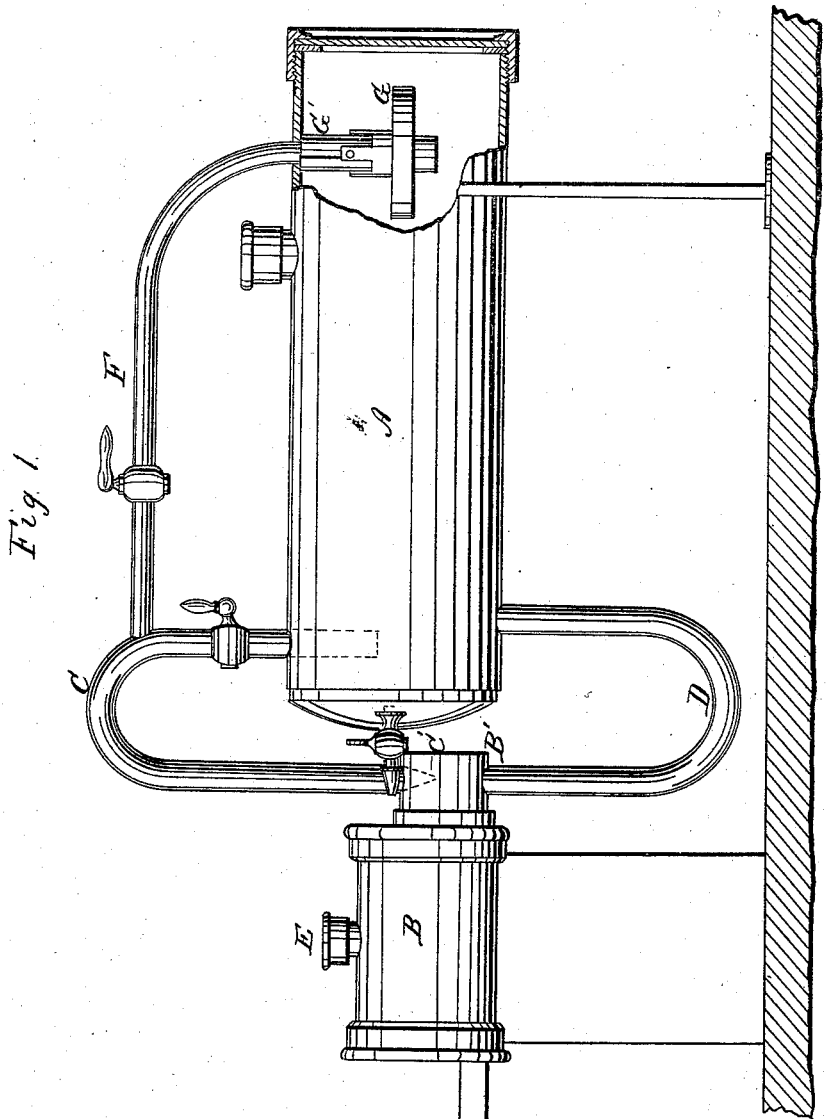
Figure 1 is an elevation partly in section.
Figure 2 is a vertical section showing the steam valve.

The same letters are used in both figures in the indication of parts which are identical.

A represents the steam generator, and B the feeder, which is a cylinder of boiler iron or other suitable material, made air-tight, and having an elongation, B', smaller than the body of the cylinder, and placed below the centre thereof. The generator A and feeder B are connected by two pipes, C and D. The former is introduced into the generator at the most convenient point in the top or end thereof. It is curved downwards, and entering the extension of the feeder B', terminates in a small orifice to which the pipe gradually tapers. The other end of the pipe is carried through the shell of the generator and terminates, with its mouth down, at the level at which it is desired to maintain the water in the generator. The pipe D connects with the generator at or near the bottom thereof, at which point is placed a check-valve, and is extended under the extension B' of the generator, opening immediately below and near to the orifice C' of the pipe C. The water may be supplied to the feeder either through a pipe in which is placed an inwardly opening valve, or the supply may be regulated by a valve to be opened by a float when the water in the feeder reaches a point below the low-water level, which valve will again be closed when the water is again raised to the proper level.

The action of the apparatus is as follows: Supposing the boiler to be filled and steam raised, the water standing above the mouth of the pipe C; the pressure of the steam will force the water through the pipe C into the feeder B, which can only be filled to the point at which the expansive force of the compressed air in the feeder will equal and counterbalance the pressure of the steam. When by the use of the steam formed in the generator, the water has fallen below the level of the mouth of the pipe C, the steam will enter the pipe, driving out the water, and issuing in a jet from the orifice C', which being driven violently into the open mouth of the pipe D, (which may be funnel formed,) will generate a current of water flowing through that pipe into the boiler through the inwardly opening check-valve. When the water has thus been raised above the mouth of the pipe C, this action will cease to be repeated as soon as the water again falls below the level of the mouth of the pipe C. The waste of water drawn from the feeder B will be supplied by a stream flowing into it from the reservoir. I have shown another mode of arranging the steam pipe. The pipe F instead of the pipe C may enter the generator, terminating with an extension $G^1$, which has on each side, and opposite one another, vertical slots. The float G is attached to a sliding collar moving freely on the extension $G^1$ of the pipe F. To this collar is attached a conical valve, $G^2$, which shuts into a valve-seat, F', in the end of the pipe F. The valve is attached to a rod passing through the slots in the extension $G^1$, and is fastened to the sliding collar. The float G is so placed that when it falls below the low-water level in the generator, it shall open the valve, and close it again as it rises. The principle of its operation is precisely as explained with regard to the open pipe C.

What I claim as my invention, and desire to secure by Letters Patent, is—

1. In combination with the generator A and feeder B, I claim the pipe C with its orifice C', and the pipe D, when arranged to operate substantially as described.

2. In combination with the generator A and feeder B, I claim the pipes D and C F, and float G and valve, arranged to operate substantially as described.

In testimony whereof I have signed my name to this specification in the presence of two subscribing witnesses.

GEORGE T. PARRY.

Witnesses:
R. MASON,
C. F. CLAUSEN.